United States Patent [19]
Pashan

[11] Patent Number: 5,321,691
[45] Date of Patent: Jun. 14, 1994

[54] ASYNCHRONOUS TRANSFER MODE (ATM) SWITCH FABRIC

[75] Inventor: Mark A. Pashan, Wheaton, Ill.

[73] Assignee: AT&T Bell Laboratories, Murray Hill, N.J.

[21] Appl. No.: 2,575

[22] Filed: Jan. 11, 1993

[51] Int. Cl.$^5$ ............................................. H04L 12/56
[52] U.S. Cl. ................................ 370/58.3; 370/60
[58] Field of Search ..................... 370/58.2, 58.3, 60, 370/60.1, 94.1; 340/826; 379/258, 268, 269, 271

[56] References Cited

U.S. PATENT DOCUMENTS 4,823,340 4/1989 Grassman et al. .................... 370/60
5,233,603 8/1993 Takeuchi et al. ..................... 370/60

OTHER PUBLICATIONS

Co-pending U.S. patent application Ser. No. 07/739928, filed Aug. 2, 1991, (M. A. Pashan et al. 3–9).
CCITT Recommendation G.709, Fascicle III.4–"Synchronous Multiplexing Structure", Melbourne, 1988, pp. 121–174.
CCITT Recommendation I.361 (revised) COMSVIII/-RAPP/R116E1.DOC, "B-ISDN ATM Layer Specification", Jul. 1992, pp. 2–15.

Primary Examiner—Benedict V. Safourek
Attorney, Agent, or Firm—Thomas Stafford

[57] ABSTRACT

In an asynchronous transfer mode (ATM) switching arrangement buffer memory capacity is effectively and efficiently increased by employing a plurality of circuit cards including a master circuit card and a plurality of so-called slave circuit cards including additional buffer memory and an internal cell format in which all of the ATM cell routing information is supplied directly to the master circuit card. Then, the master circuit card utilizes the ATM cell routing information to control writing and reading of data to and from its buffer memory locations and the buffer memory locations of each of the plurality of slave circuit cards. This control of the plurality of slave circuit cards requires only unidirectional communications links to pass the control information from the master circuit card to the slave circuit cards.

13 Claims, 4 Drawing Sheets

FIG. 4 shows the expanded 56 byte ATM cell format of FIG. 3 arranged in a sequence of 16, 28 bit parallel words; and FIG. 5 shows the shuffled bits of the 28 bit words of FIG. 4 in forming a plurality of bundles.

ASYNCHRONOUS TRANSFER MODE (ATM) SWITCH FABRIC

CROSS REFERENCE TO RELATED APPLICATION

U.S. patent application Ser. Nos. 08/002,576, filed Jan. 11, 1993 by G. D. Martin and H. Ueda and 08/002,577, filed Jan. 11, 1993 by D. Dominijanni and M. A. Pashan were filed currently herewith.

TECHNICAL FIELD

This invention relates to digital switch fabrics and, more particularly, to buffer memory units for storing ATM cells.

BACKGROUND OF THE INVENTION

Prior known ATM switch arrangements could not handle bursty data at high bandwidth and a low ATM cell loss rate because of limited ATM cell buffer memory capacity. In order to increase the ATM cell buffer memory capacity, additional memory circuit cards would be required in the prior switch arrangements.

In such prior switch arrangements, if so-called bit slicing was to be employed, ATM cell routing information would be dispursed among the plurality of circuit cards comprising the switch fabric. Then, there would be a need for bidirectional communication links between the plurality of circuit cards in order to collect the dispursed routing information. This, in turn, causes a need for a large number of the bidirectional communications links which is undesirable from both equipment and cost standpoints.

It is noted that ATM transmission of data is on a cell-by-cell basis wherein each cell comprises a predetermined number of bytes for transporting a fixed length packet. Thus, in the ATM context, the term cell and packet are interchangeable.

SUMMARY OF THE INVENTION

The problems with prior ATM switching arrangements regarding buffer memory capacity are overcome, in accordance with the principles of the invention, by employing a plurality of circuit cards including a master circuit card and a plurality of so-called slave circuit cards and an internal cell format in which all of the ATM cell routing information is supplied directly to the master circuit card. Then, the master circuit card utilizes the ATM cell routing information to control writing and reading of data to and from its buffer memory locations and buffer memory locations of each of the plurality of slave circuit cards. This control of the plurality of slave circuit cards requires only unidirectional communications links to pass the control information from the master circuit card to the slave circuit cards.

DETAILED DESCRIPTION

Figure 1:
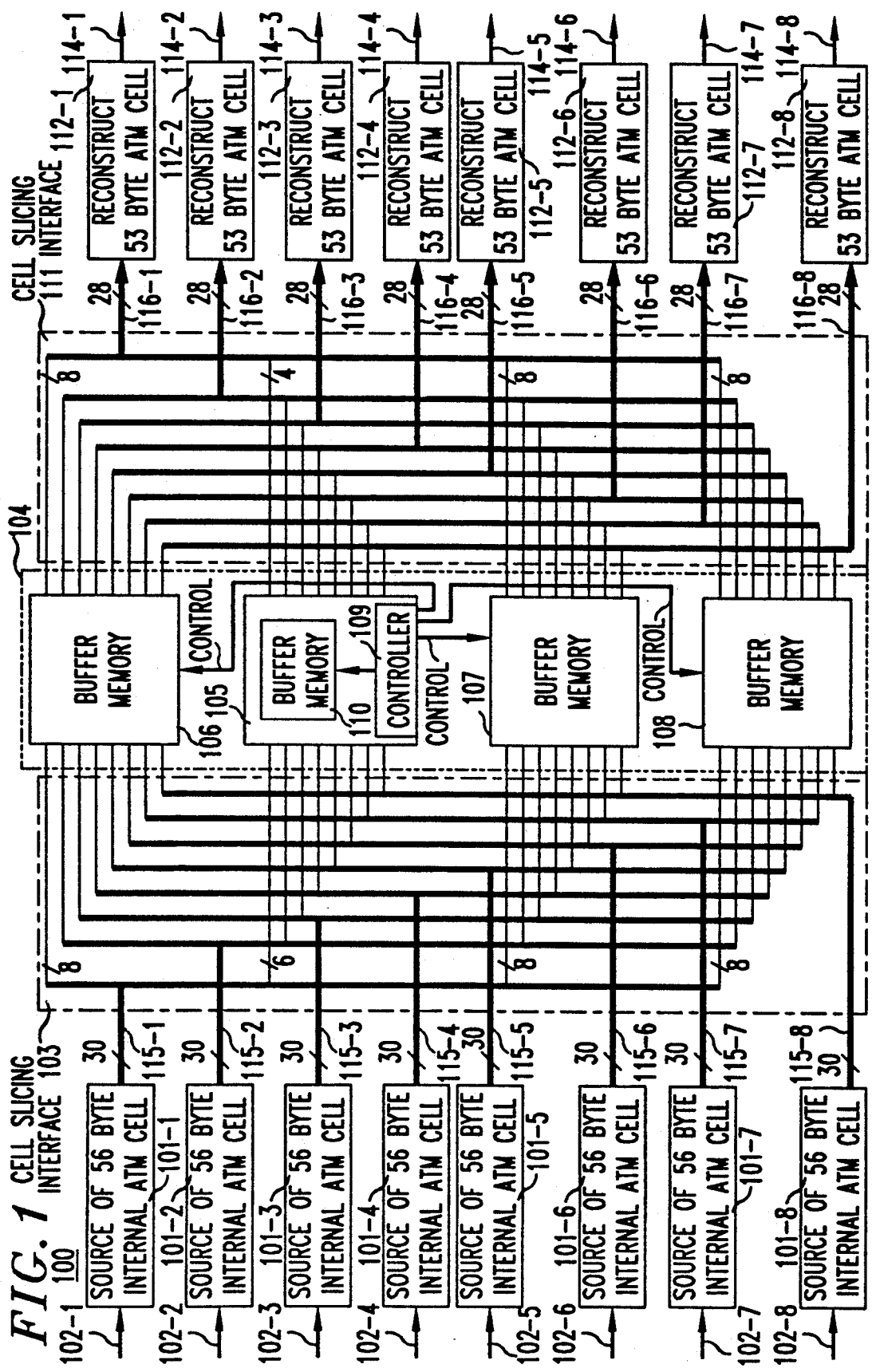
FIG. 1 shows, in simplified block diagram form, a memory based switch architecture including an embodiment of the invention.

FIG. 1 shows, in simplified block diagram form, memory based switch 100, which in this example, is an "8×8" switch fabric comprised of an incoming interface stage, including a plurality of source of 56 byte internal ATM cell units, namely, units 101-1 through 101-8. Each of units 101-1 through 101-8 is supplied via input terminals 102-1 through 102-8, respectively, with an incoming digital signal of a type capable of transporting standard 53 byte ATM cells. The incoming digital signals may be any one of a number of such signals capable of transporting such ATM cells in its payload envelope. For example, the digital signal could be a digital synchronous hierarchy (SDH), SONET or the like signal. In this example, it is assumed that the ATM cells are being transported in STM-1 SDH digital signals of a type known in the art. It is noted that the standard 53 byte ATM cell is defined in CCITT Recommendation I.361, entitled "B-ISDN ATM Layer Specification", dated July 1992, and the STM-1 digital signal format is described in CCITT Recommendation G.709, entitled "Synchronous Multiplexing Structure", dated 1988. For brevity and clarity of exposition, only one (1) STM-1 signal and one ATM cell stream is shown and will be described for each of the units 101. However, it will be apparent to those skilled in the art that a number (e.g., 16) of ATM cell streams transported by such STM-1 digital signals may be combined, i.e., multiplexed together, for internal processing and switching. The incoming STM-1 digital signals being supplied via input terminals 102 are processed in units 101, as described below, to supply as an output, expanded 56 byte ATM cells via buses 115-1 through 115-8, respectively, and cell slicing interface 103 to switch fabric 104. As indicated, each of buses 115 supply a sequence of 30 bit parallel words in predetermined bundles as will be described below.

Cell slicing interface 103, in this example, is a hard wired interface for transporting so-called "slices of the expanded ATM cells" from units 101 to switch fabric 104. To this end, it is physically arranged to supply an eight (8) bit slice from each of units 101 to each of the buffer memories in slave circuit cards 106, 107 and 108, and a six (6) bit slice from each of units 101 to master circuit card 105. Note that the six (6) bit slice includes four (4) bits of the expanded 56 byte ATM cell used in a routing control field as described below and two (2) replicated type bits. Thus, a sequence of 16, 30 bit parallel words are supplied from each of units 101 via buses 115 and cell slicing interface 103 to switch fabric 104 for each expanded 56 byte ATM cell being transported. By way of a more specific example, unit 101-1 supplies a sequence of 16, 30 bit parallel words for each expanded 56 byte ATM cell as an output via bus 115-1. The first eight (8) bits (i.e., first slice) are supplied to buffer memory 106, the next six (6) bits (i.e., second slice), including the control bundle and the two type bits, are supplied to master control card 105, the next eight (8) bits (i.e., third slice) are supplied to buffer memory 107 and the last eight (8) bits (i.e., fourth slice) are supplied to buffer memory 108. Each of the remaining ones of units 101 supply their sequences of 30 bit parallel word outputs to switch fabric 104 in similar fashion via buses 115 and cell slicing interface 103.

Switch fabric 104, as indicated above, comprises a master circuit card 105 and a plurality of slave circuit cards, in this example, slave circuit cards 106, 107 and 108. Switch fabric 104 is actually a memory based switch architecture in which master circuit card 105 includes controller 109 and buffer memory 110. Each of slave circuit cards 106, 107 and 108 comprises a buffer memory unit. Because of the physical limitations of technology, the ATM cell data must be "sliced" over a plurality of memory circuit cards in order to have a desired memory capacity in order to efficiently and effectively process the ATM cell data, in accordance with the invention. As indicated above, in this example, the buffer memory units are in master circuit card 105 and slave circuit cards 106, 107 and 108. Each of the slave circuit cards 106, 107 and 108 includes cell buffer memory for 16 bytes of an expanded 56 byte ATM cell, while buffer memory 110 in master circuit card 105 has cell buffer memory for the remaining eight (8) bytes of the expanded 56 byte ATM cell. Thus, the memory capacity of switch fabric 104 is, in this example, one expanded 56 byte ATM cell wide.

Controller 109 operates the buffer memory of slave circuit cards 106, 107 and 108 and buffer memory 110 as both a time-division switch and as a shared-buffering system. It provides addresses for inserting incoming expanded 56 byte ATM cells into memory queues corresponding to the intended output port from switch fabric 104 to which the individual cells are destined, as well as, write and read controls. To this end, switch fabric 104 includes eight (8) queuing buffers corresponding to the eight (8) output ports. These queuing buffers are linked lists of memory locations, so that any of the memory cell locations can be dynamically allocated under control of controller 105 to any output port queuing buffer.

Thus, controller 109 functions to generate addresses and write and read controls for all of the buffer memories on circuit cards 105 through 108. It employs the supplied routing control signals and the type bits to effect this result. Note, that if the type bits indicate an idle cell, the write control for that cell is withheld and, consequently, the idle cell is not written into buffer memory. Additionally, if there is no cell in the buffer memory to be supplied as an output to a particular output port, a cell having a prescribed format is supplied to that output port under control of controller 109.

The expanded 56 byte ATM cells are supplied as an output from switch fabric 104 as sequences of 16, 28 bit parallel words via cell slicing interface 111 and buses 116-1 through 116-8 to reconstruct 53 byte ATM cell units 112-1 through 112-8, respectively. Specifically, a plurality of eight (8) bit (first) slices is supplied from the buffer memory in slave card 106 on a one-to-one basis via cell slicing interface 111 and buses 116-1 through 116-8 to units 112-1 through 112-8, respectively. A plurality of four (4) bit (second) slices is supplied from buffer memory 110 in master circuit card 105 on a one-to-one basis via cell slicing interface 111 and buses 116-1 through 116-8 to units 112-1 through 112-8, respectively. The next plurality of eight (8) bit (third) slices is supplied from the buffer memory in slave card 107 on a one-to-one basis via cell slicing interface 111 and buses 116-1 through 116-8 to units 112-1 through 112-8, respectively. The final plurality of eight (8) bit (fourth) slices is supplied from the buffer memory on slave card 108 on a one-to-one basis via cell slicing interface 111 and buses 116-1 through 116-8 to units 112-1 through 112-8, respectively. As indicated, buses 116-1 through 116-8 carry a 28 bit parallel word to reconstruct 53 byte ATM cell units 112-1 through 112-8, respectively. Again, it is noted that cell slicing interface 111 is a hard wired arrangement which carries the bits of the expanded 56 byte ATM cell in bundle fashion as described above.

Each of reconstructed 53 byte ATM cell units 112 operates on the supplied sequence of 16, 28 bit parallel words comprising an expanded 56 byte ATM cell to reconstruct the standard 53 byte ATM cell. Again, in this example, the standard 53 byte ATM cells are transported in STM-1 SDH digital signals. It will be apparent to those skilled in the art that the reconstructed standard 53 byte ATM cells to be transported in the STM-1 digital signals as outputs are derived by the inverse operations employed to generate the expanded 56 byte ATM cell from incoming standard 53 byte ATM cells, which are transported in the incoming STM-1 signals. The outgoing STM-1 signals transporting the reconstructed standard 53 byte ATM cells are supplied as outputs from units 112-1 through 112-8 via output terminals 114-1 through 114-8, respectively.

Figure 2:
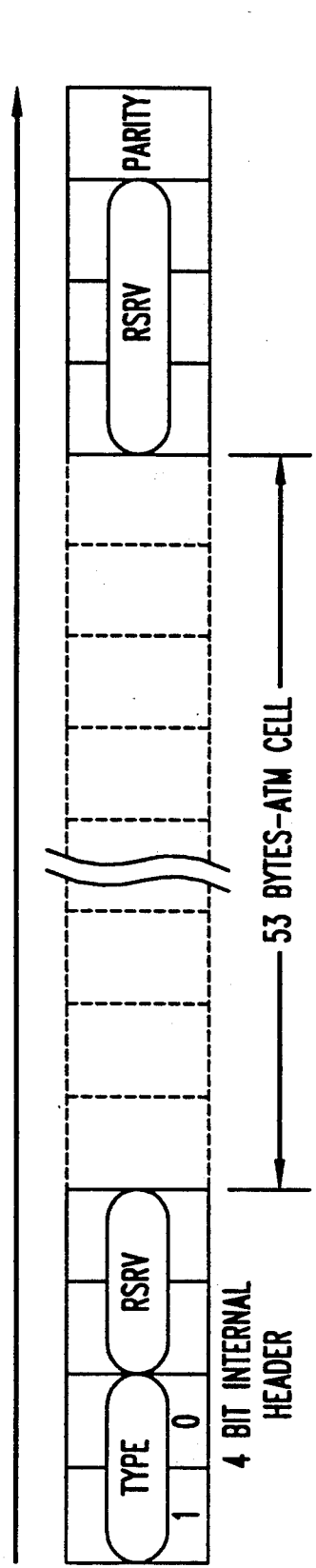
FIG. 2 shows an internal 54 byte ATM cell format useful in describing the invention.

As indicated above, each source of 56 byte internal ATM cell units 101 is operative to generate expanded 56 byte ATM cells. To this end, an internal 54 byte ATM cell is generated from the standard 53 byte ATM cells being transported in the incoming STM-1 signals. This is necessary so that an internal clock rate may be used which is equal to the incoming STM-1 clock. This is important because the STM-1 payload would require a non-standard payload clock which is not typically available, while the STM-1 clock rate is readily available. The internal 54 byte ATM cell format is shown in FIG. 2. Use of the desired internal clock rate equal to the incoming signal clock rate is realized by increasing the number of bytes in an ATM cell from the standard 53 bytes to 54 bytes and by controllably generating and inserting internal idle cells into the ATM cell stream. The internal idle cells are inserted at instants such that a predetermined integer number of internal 54 byte ATM cells occur during a predetermined interval, for example, 125 $\mu$sec. interval. One such arrangement for generating such an internal 54 byte ATM cell is described in co-pending U.S. patent application Ser. No. 08/002,576, filed concurrently herewith. Note that the first two (2) bits in the internal 54 byte ATM cell are the type bits from the second slice of six (6) bits which indicate whether or not the ATM cell is an idle cell and whether or not the ATM cell is an internally generated cell. These two type bits are replicated to be supplied to master circuit card 105, as indicated below.

Figure 3:
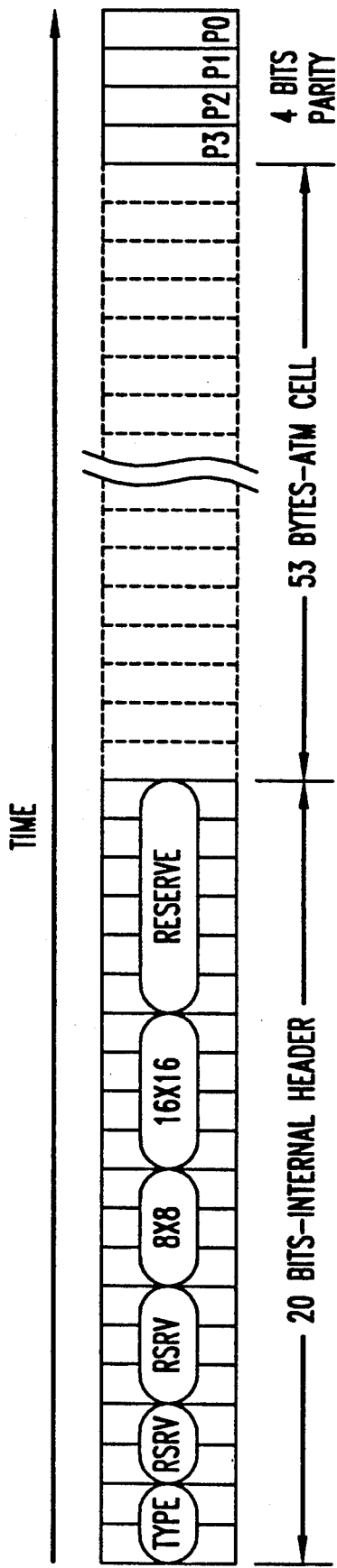
FIG. 3 shows an internal expanded 56 byte ATM cell format also useful in describing the invention.
Figure 4:
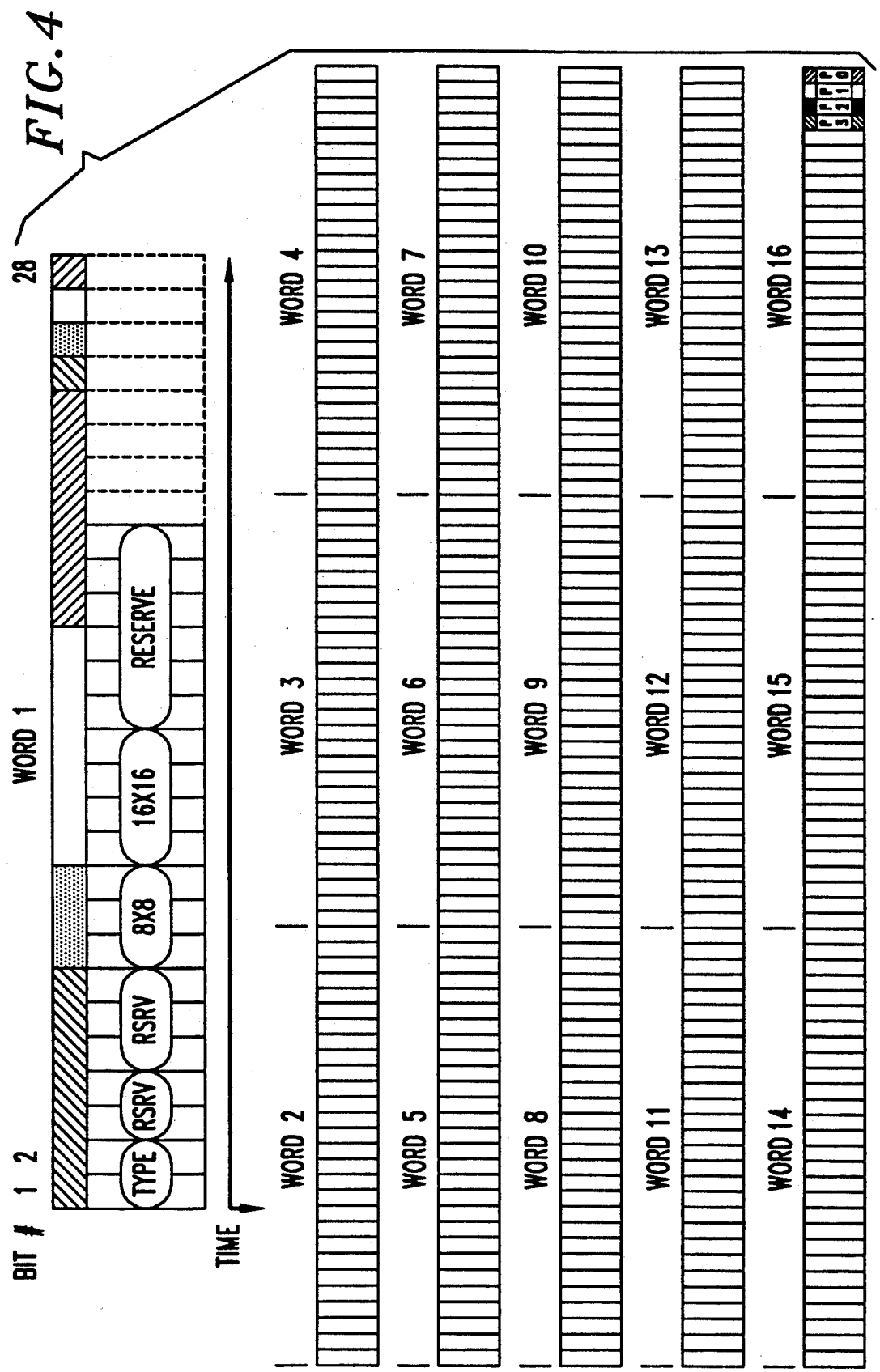
Figure 5:
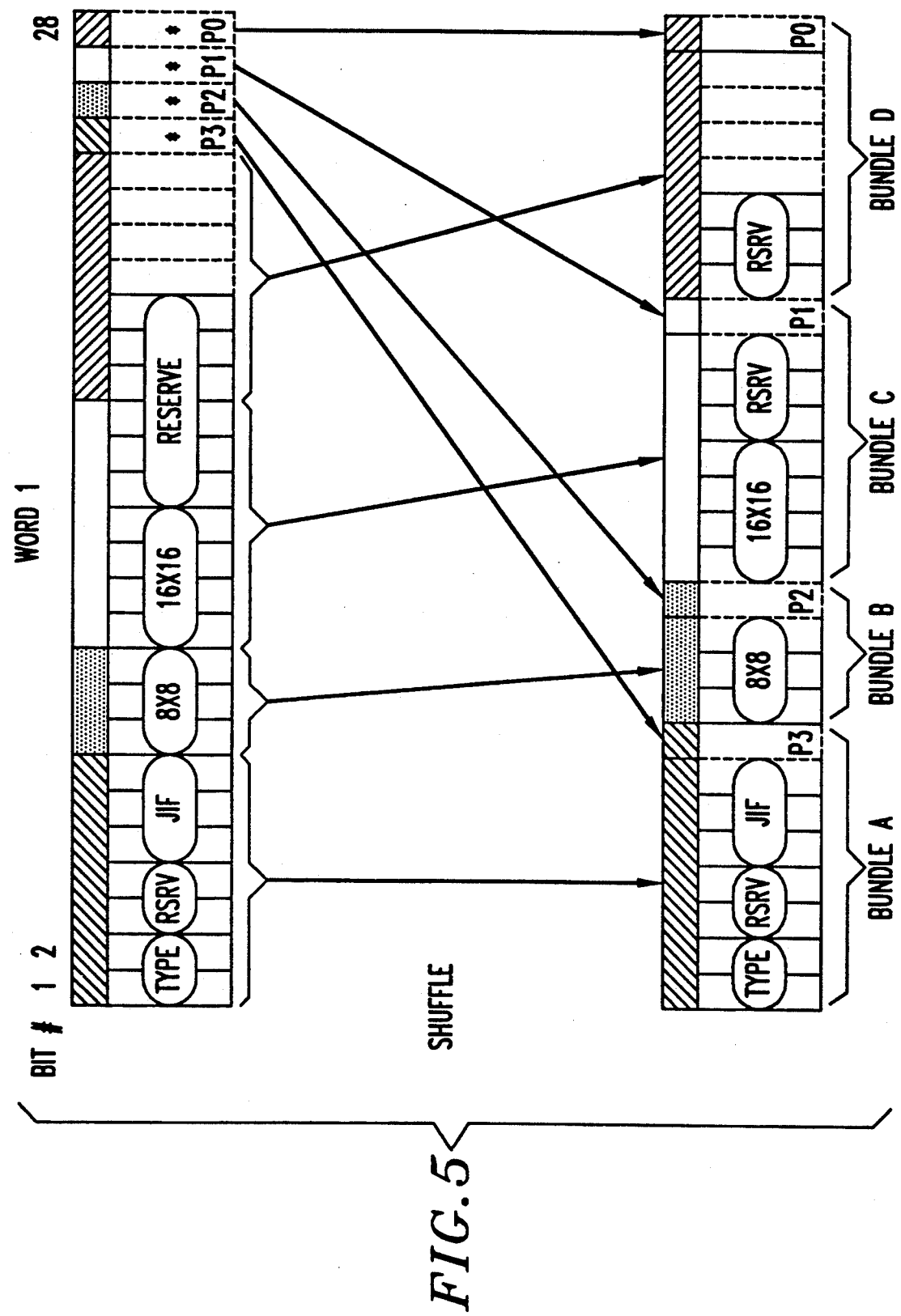

The internal 54 byte ATM cell is employed to generate the expanded 56 byte ATM cell, as shown in FIG. 3. This expanded 56 byte ATM cell is arranged in a format which greatly facilitates the cell slicing in switch fabric 104, in accordance with the invention. Note that the expanded 56 byte ATM cell is comprised of a 20 bit header, including the two type bits, then five reserve (RSRV) bits, an "8×8" routing control field, a "16×16" control field (not important to this invention) and six (6) additional reserve bits, 53 bytes including the standard ATM cell and four (4) parity bits. The expanded 56 byte ATM cell is arranged into a sequence of 16, 28 bit parallel words as shown in FIG. 4. Note that the first one of the 16, 28 bit words includes the expanded ATM cell header and the 16th word includes four (4) parity bit positions. The bits of the 28 bit parallel words are shuffled as shown in FIG. 5 into predetermined bundles, namely, bundles A, B, C and D. Note, that although FIG. 5 shows the first word as including the parity bit positions P0, P1, P2 and P3, the actual parity bits are only transported in word 16. As shown in FIG. 5, bundle A includes bit positions 1 through 7 and bit position 25 of each word, bundle B includes bit positions 8 through 10 and bit position 26 of each word, bundle C includes bit positions 11 through 17 and bit position 27 of each word and bundle D includes bit positions 18 through 24 and bit position 28 of each word. Bundle A is supplied from each of units 101-1 through 101-8 to buffer memory in slave circuit card 106, Bundle B along with the two (2) type bits is supplied from each of units 101-1 through 101-8 to master control circuit card 105, Bundle C is supplied from each of units 101-1 through 101-8 to buffer memory in slave circuit card 107, and finally Bundle D is supplied from each of units 101-1 through 101-8 to buffer memory in slave circuit card 108. Since Bundle B from each of units 101-1 through 101-8 transports the routing control information for the corresponding cell, it is seen that all the switching control information for all of the ATM cells to be switched via switching fabric 104 is supplied to controller 109 in master circuit card 105 and, consequently, only uni-directional control communications links are needed from controller 109 in master circuit card 105 to control buffer memory 110 and the buffer memories in slave circuit cards 106, 107 and 108, in accordance with the invention. Additionally, it is noted that the two (2) type bits from the first slice are replicated and supplied as an output from units 101 along with the four (4) bits in bundle B, thereby forming a six (6) bit bundle, i.e., the second slice. Consequently, the parallel words being supplied as an output from units 101 are actually 30 bit parallel words. An arrangement for generating such an expanded ATM cell is described in co-pending U.S. patent application Ser. No. 08/002,577, filed concurrently herewith.

The above identified arrangements are, of course, merely illustrative of the application of the principles of the invention. Other arrangements may be devised by those skilled in the art without departing from the spirit or scope of the invention.

I claim:

1. An asynchronous transfer mode (ATM) memory-based switch fabric comprising:
   a master circuit card including a controller for generating buffer memory addresses and write and read controls and a buffer memory;
   a plurality of slave circuit cards, each including a buffer memory;
   a plurality of uni-directional communication links, each for supplying said addresses and write and read controls from said controller to an individual one of said buffer memories;
   a source of expanded ATM cells wherein each expanded ATM cell is partitioned into a plurality of bundles, a prescribed one of said bundles transporting routing control information for an ATM cell being transported by each said expanded ATM cell;
   means for supplying individual ones of said bundles on a predetermined one-to-one basis to buffer memory in individual ones of said slave circuit cards and said bundle transporting said routing control information to said master circuit card, said controller and said master circuit card employing said routing control information to generate said addresses and said read and write controls to be supplied over said uni-directional communications link to said buffer memories in order to control said switching of said expanded ATM cell through said fabric.

2. The apparatus of claim 1 wherein said controller operates said buffer memory of each of said slave circuit cards and said buffer memory of said master circuit card as a time-division switch.

3. The apparatus of claim 1 wherein said controller operates said buffer memory of each of said slave circuit cards and said buffer memory of said master circuit card as a shared buffering system.

4. The apparatus of claim 3 wherein said controller inserts said expanded ATM cell into one of a plurality of memory queues corresponding to one of a plurality of predetermined output ports.

5. The apparatus of claim 4 wherein each one of said plurality of memory queues comprises a queueing buffer having a linked list of memory locations so that any memory address may be allocated to any of said output ports under control of said controller.

6. The apparatus of claim 4 wherein each one of said output ports is supplied with a cell having a prescribed format under control of said controller when there is no ATM cell in a buffer memory corresponding to each one of said output ports.

7. The apparatus of claim 1 wherein each of said expanded ATM cells comprises a 20 bit header including two type bits, five reserve bits, an 8 by 8 control field, a 16 by 16 control field, six additional reserve bits, a 53 byte ATM cell, and four parity bits.

8. The apparatus of claim 7 wherein each of said expanded ATM cells is arranged into a sequence of 16, 28 bit words wherein each 28 bit word has 28 bit positions.

9. The apparatus of claim 8 wherein a first of said 16, 28 bit words includes an expanded ATM cell header and a last of said 16, 28 bit words includes four parity bit positions.

10. The apparatus of claim 9 wherein said plurality of bundles includes a first bundle, a second bundle, a third bundle, and a fourth bundle wherein said first bundle includes bit positions 1 through 7 and bit position 25 of each of said 28 bit words, said second bundle includes bit positions 8 through 10 and bit position 26 of each of said 28 bit words, said third bundle includes bit positions 11 through 17 and bit position 27 of each of said 28 bit words, and said fourth bundle includes bit positions 18 through 24 and bit position 28 of each of said 28 bit words.

11. The apparatus of claim 1 wherein each of said expanded ATM cells is generated from an ATM cell in an incoming STM-1 signal.

12. The apparatus of claim 11 wherein said means for supplying includes means for increasing a number of bytes in said ATM cell in said STM-1 signal.

13. The apparatus of claim 12 wherein said means for increasing includes controllably generating and inserting idle cells into a stream of ATM cells.

* * * * *